Sept. 4, 1962             J. FREY             3,052,518
PROCESS AND APPARATUS FOR THE MANUFACTURE OF ALUMINUM CHLORIDE
Filed April 4, 1960
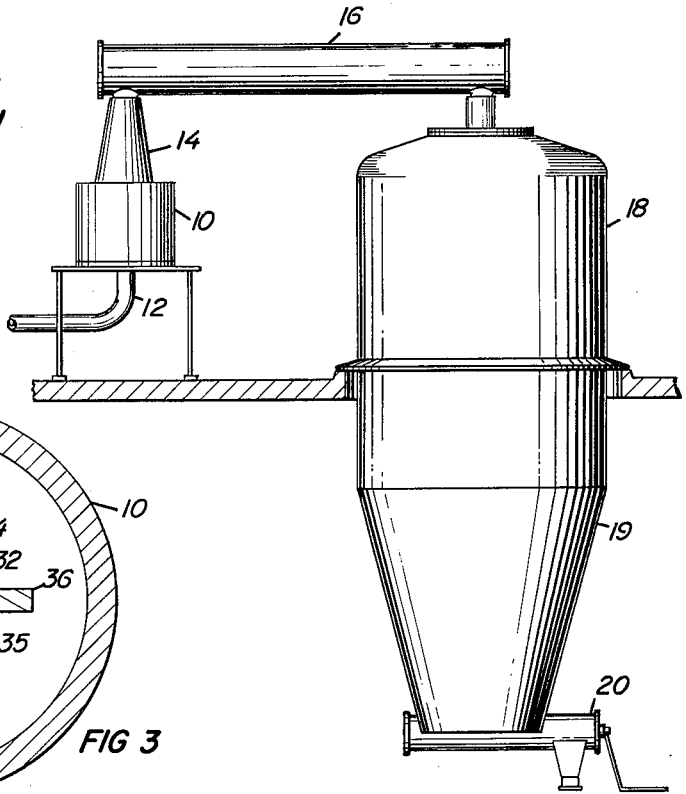
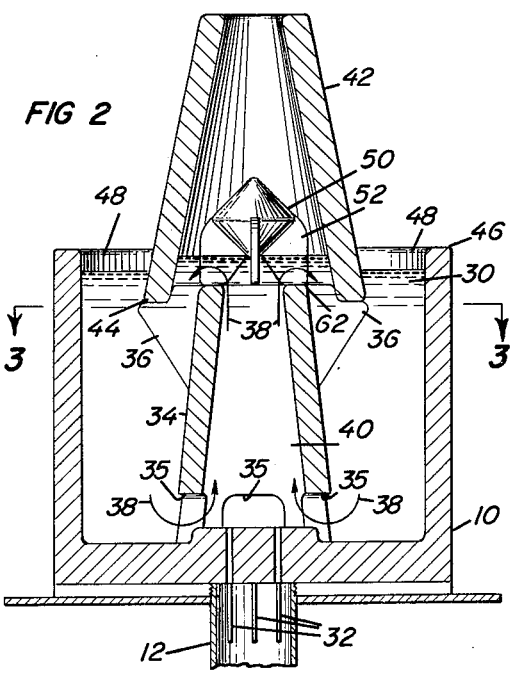
INVENTOR
Jost Frey
by Wenderoth, Lind & Ponack
ATTORNEYS

United States Patent Office 3,052,518
Patented Sept. 4, 1962

3,052,518
PROCESS AND APPARATUS FOR THE MANUFACTURE OF ALUMINUM CHLORIDE
Jost Frey, Monthey, Switzerland, assignor to Ciba Limited, Basel, Switzerland
Filed Apr. 4, 1960, Ser. No. 19,622
Claims priority, application Switzerland Dec. 18, 1959
2 Claims. (Cl. 23—93)

The present invention provides a process for the manufacture of aluminum chloride by reacting the molten metal with chlorine.

Such processes for the manufacture of metal chlorides have been proposed, for example, in United States Patent No. 2,849,293 issued August 26, 1958 to C. B. Wendell, Jr. et al. If the metal used as starting material is not pure, the metal chloride formed contains contaminants that are capable of chlorination and can be removed from the chloride only by a troublesome process. Thus, for example, in the manufacture of aluminum chloride the formation of iron chloride can hardly be prevented, since the aluminum used as starting material invariably contains a small amount of iron. In a continuous process such impurities cause further difficulties, since in the course of time impurities and by-products collect in the apparatus in the form of slag and cause trouble. It is therefore necessary frequently to interrupt the chlorination process to cleanse the apparatus.

The present invention provides a process for carrying out the chlorination of molten metal by reaction with chlorine in a continuous manner, wherein the chlorination of the metal and the abstraction of the heat liberated by the reaction are carried out in separate zones, while the molten metal is continuously circulated through the two zones.

It is of advantage to arrange the cooling zone concentrically about the chlorination zone.

The invention further provides an apparatus for performing the present process. The process and apparatus of the invention are exemplified with reference to the accompanying drawing, in which FIG. 1 is a general view of the whole apparatus, FIG. 2 is an elevation of the vessel used for the chlorination, and FIG. 3 is a cross-section taken on the line 3—3 in FIG. 2.

The apparatus shown in FIG. 1 is for the manufacture of aluminum chloride. The molten aluminum is container in a crucible 10 into which chlorine is introduced through a pipe 12. Above the crucible there is a collecting funnel 14 for the ascending aluminum chloride vapor. From the upper end of the funnel the aluminum chloride vapor passes through a connecting pipe 16 into a cooling chamber 18 where the aluminum chloride settles out in solid form. It collects in the lower portion 19 of a chamber 18, is discharged by a worm conveyor 20 and, for example, charged into a transport container 22.

The crucible 10 used for the chlorination, and constructed in accordance with the invention, is shown in FIGS. 2 and 3. As shown in FIG. 2 the molten metal 30 is contained in the crucible 10. Chlorine is introduced into the bottom of the crucible through a relatively large number of inlets 32, for example, four inlets as shown in FIG. 3. Inside the crucible is a tubular member 34 below the level of the metal melt and having a vertical passage, and which is held in position within the crucible by means of feet 35. The said member is spaced at such distances from the bottom of the crucible and from the surface of the metal melt as to enable the metal to circulate through the passage in the member 34 as indicated by the arrows 38. The tubular member divides the contents of the crucible, that is to say, the metal contained therein, into two inter-communicating zones, namely a first and principal chlorination zone 40 within the tubular member, and a cooling zone outside that member.

Above the tubular member is a funnel 42 for collecting the aluminum chloride vapor leaving the metal melt. The lower edge 44 of the said funnel dips into the metal melt in such manner that between the edge of the funnel and the upper edge 46 of the crucible 10 an annular channel 48 is formed, which is open at the top. The channel forms part of the aforesaid second zone separated off by the member 34.

It is of advantage to support and center the funnel 42 by means of radial lugs 36 provided on the member 34.

In another construction of the apparatus there is provided within the funnel 42 a spray baffle 50 which may, as shown in FIG. 2, take the form of a double cone having an upwardly and downwardly directed apex. The baffle 50 is located above the surface of the metal within the funnel 42, and prevents metal spray from the melt entrained with the issuing aluminum chloride vapor from being thrown towards the upper end of the funnel, where such metal spray would solidify and in the course of time clog up the funnel. In the apparatus shown in FIG. 2 the spray baffle 50 is centered by means of a plurality of radial ribs 52 on the upper edge 62 of the member 34 and thus at the same time positioned in the interior of the funnel.

Into the open annular channel between the edge of the crucible and the funnel solid aluminum is introduced in a suitable form into the cooling zone, whereupon it melts and slowly sinks into the melt.

Chlorine is introduced through the inlets 32 into the molten metal 30 within the crucible, the inlets being located beneath the passage in the member 34. The chlorine reacts with the metal contained in the member 34 with evolution of heat, and the aluminum chloride formed leaves the melt in the form of vapor.

As the upper edge of the member 34 is within the collecting funnel 42, all the aluminum chloride formed is collected and can be discharged through the connecting pipe 16 into the cooling chamber 18.

The ascending aluminum chloride vapor and the heat of chlorination cause the metal to ascend within the member 34. The metal rises above the upper edge 62 of the member 34 and, as shown by the arrows 38, it enters the cooling zone between the member 34 and the wall of the crucible. Since the wall of the crucible is not insulated against loss of heat to the exterior, and, according to a preferred form of the apparatus, is made of a material having a very good heat conductivity, the metal cools in the second zone, descends and returns to the chlorination zone proper through openings between the bottom of the crucible and the lower edge of the member 34. In this manner a continuous circulation through the two zones is maintained, the reaction zone being located within the member 34 and the cooling zone outside the said member.

The slag formed by side reactions with impurities present in the metal and impurities present in the chlorine passes into the second zone where it ascends and collects on the free surface of the metal present between the edge of the funnel and the edge of the crucible, or they deposit on the wall of the crucible from which they are periodically removed from the outside.

When the aluminum is chlorinated such slag contains principally aluminum oxide, but also foreign metals introduced together with the aluminum, more especially iron. The iron accumulates in the melt, but not to a harmful extent. In fact, at an iron content of about 3% crystals of $FeAl_3$ are formed, which are carried out of the chlorination zone proper by the circulating melt. In this manner substantially pure aluminum chloride can be manufactured, even though the parent metal has a certain content of iron. Whereas the aluminum chloride obtained by other chlorination processes, owing to its content of iron, needs to be subjected to a subsequent separating operation such, for example, as distillation under superatmospheric pressure in the presence of aluminum chippings, extremely pure aluminum chloride is obtained by the process of this invention and there is no need for any purification.

These advantages are achieved by the invention by dividing the total volume of metal into a chlorination zone and a cooling zone. The circulation of the molten metal through these two zones is assisted by the injection of chlorine into the reaction zone.

The injection of chlorine also considerably increases the area of contact and time of contact between the chlorine and the metal as compared with known processes in which chlorine was merely passed over the surface of a melt or was blown on to a melt. The circulation at the same time assists the separation of slag and impurities outside the reaction zone and prevents incrustations forming on the chlorine inlets. If such inlets were used without the aforesaid circulation, they would become clogged up in a short time. The circulation also enables the heat of reaction to be abstracted in an extremely simple manner without additional cooling devices. The arrangement of the cooling zone so as to surround the reaction zone considerably increases the external surface so that there is no obstacle to the abstraction of the said heat by radiation. The temperature drop between reaction zone and cooling zone also assists the circulation of the molten metal and the separation of slag in the cooling zone. The additional cooling devices necessary in the known apparatus complicate the process and the apparatus, and constitute a considerable danger when water is used as the cooling means.

The radiation of heat from the cooling zone to the surrounding air is assisted by using as construction material for the external vessel a material that is both corrosion-resistant and heat-conductive. The positioning of the cooling zone outside the reaction zone makes the cooling zone readily accessible and facilitates the periodical removal of slag from the cooling zone. This prevents the accumulation of incrustations which in the course of time would bring the circulation to a halt.

To achieve an optimum output it is of advantage to provide for the passage of as much heat as possible through the wall of the crucible by using for its construction a good heat-conductor, such as corundum or sillimanite. The process of the invention therefore requires no forced cooling, for example, water cooling, such as is needed for the known apparatus. This considerably enhances the reliability of operation, since occasional breakdowns of the cooling systems can never be wholly avoided, and the presence of water in the vicinity of liquid aluminum is always dangerous. Moreover, the aforesaid materials are much more resistant to corrosion than the frequently used graphite.

The following example illustrates the process of the invention with the use of the apparatus described above and illustrated in the accompanying drawing: However, the invention is not limited to this particular embodiment. Its scope includes all chlorinations of liquid metal in which a gaseous product is formed.

The crucible shown in FIGS. 2 and 3 had a diameter of about 40 cm. and was charged with about 50 kg. of molten aluminum of 99.5–99.7% purity (primary aluminum pig). Chlorine was injected into the crucible through the inlets at the bottom at the rate of about 9.5 kg. per hour. The chlorine was free from oxygen and air and contained on an average less than 0.1% of carbon dioxide. The aluminum was maintained at a temperature of about 700° C. During the chlorination fresh aluminum was added at an average rate of 2.55 kg. per hour.

During the process a small amount of slag deposited on the outer edge of the crucible, and this slag was loosened by careful scraping and then skimmed off the surface of the molten metal in the form of a pulverulent material. The slag consisted principally of aluminum oxide, but also contained some foreign metals, more especially iron, originally present in the aluminum. At the throughput rates mentioned above, the amount of slag formed was about 3 kg. per day. The quantity of iron present in the melt in the crucible during the process rose to about 2–3%, but the aluminum chloride obtained as the final product was substantially free from iron. The ascending aluminum chloride vapor from the chlorination apparatus passed into the cooling chamber 18 through the pipe 16 which was suitably insulated so as to maintain it at a temperature of about 200° C.

The throughput rates mentioned above yielded on an average 11.9 kg. of aluminum chloride per hour. After the air initially present in the apparatus had been displaced, only negligible amounts of residual gas escaped with the waste gas, which was free from chlorine.

The yield of aluminum chloride calculated on aluminum amounted to over 90% and, calculated on chlorine used, to 99.9%. The final product had a purity of 99%. Iron impurities were less than 0.005%, and generally 0.001 to 0.003%.

In order to start the process the empty reaction crucible was first heated to 700° C. by means of a removable heating coil arranged about the crucible, and the air was expelled from the crucible by introducing a weak current of nitrogen through the chlorine injection inlets. The connecting pipe 16 had previously been heated to 180° C. Aluminum, which had been melted in a separate furnace, was then charged into the crucible and at the same time the injection of chlorine took the place of the scavenging nitrogen. The heating coil used for the heating up was then removed and the process carried on in a continuous manner as described above.

What is claimed is:

1. A continuous process for the manufacture of aluminum chloride which comprises (a) introducing chlorine into molten aluminum in a reaction zone, whereby the chlorine reacts with the molten aluminum to form aluminum chloride, (b) removing the formed aluminum chloride as a vapor from above the reaction zone, (c) passing molten aluminum free of aluminum chloride from the reaction zone to a cooling zone separated from said reaction zone and wherein impurities in the molten aluminum precipitate, (d) feeding aluminum into the cooling zone, (e) removing precipitated impurities from said cooling zone, whereby the molten aluminum in the cooling zone is purified, and (f) recycling purified molten aluminum from the cooling zone into the reaction zone.

2. A crucible for the chlorination of aluminum which consists essentially of side walls, a base, a tubular member and means for collecting vapor; the side walls and tubular member each being independently directly secured to the base in such a manner that the tubular member is interior of and separated from said side walls so as to provide annular space between said tubular member and said side walls, said tubular member being provided at the upper and lower extremities thereof with means for permitting the passage of liquid between the interior thereof and the annular space between said tubular member and the side walls; the base being provided with inlet means, integral and coextensive therewith, for introducing chlorine directly into the interior of the tubular member before contact with liquid exterior of said tubular member; the means for collecting vapor being secured at the end of the tubular member farther removed from the base, and supported by said tubular member, the portion of said means closest to said tubular member surrounding said tubular member and providing an open annulus between said portion and the side walls of the crucible.

References Cited in the file of this patent

UNITED STATES PATENTS

| | | |
|---|---|---|
| 1,601,938 | Campbell | Oct. 5, 1926 |
| 1,777,132 | Smith | Sept. 30, 1930 |
| 1,937,419 | Wolf et al. | Nov. 28, 1933 |
| 2,031,987 | Sullivan | Feb. 25, 1936 |
| 2,632,028 | Adams et al. | Mar. 17, 1953 |
| 2,813,850 | VanDijk et al. | Nov. 19, 1957 |
| 2,849,293 | Wendell et al. | Aug. 26, 1958 |
| 2,885,272 | Kimberlin et al. | May 5, 1959 |

FOREIGN PATENTS

| | | |
|---|---|---|
| 205,404 | Australia | Nov. 8, 1956 |
| 868,145 | Germany | Feb. 23, 1953 |
| 955,317 | Germany | Jan. 3, 1957 |